US009770147B2

(12) United States Patent
Lee et al.

(10) Patent No.: US 9,770,147 B2
(45) Date of Patent: Sep. 26, 2017

(54) APPARATUS FOR DIVERTING FLUID FLOW PATH (71) Applicant: Samsung Electronics Co., Ltd., Suwon-si (KR)

(72) Inventors: Byung-Jo Lee, Gwangju-si (KR); See-hyun Kim, Gwangju-si (KR); Myoung-Sun Choung, Gwangju-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 696 days.

(21) Appl. No.: 14/260,729

(22) Filed: Apr. 24, 2014

(65) Prior Publication Data
US 2014/0230180 A1 Aug. 21, 2014

Related U.S. Application Data (63) Continuation of application No. 12/704,054, filed on Feb. 11, 2010, now Pat. No. 8,789,234.

(30) Foreign Application Priority Data

Apr. 7, 2009 (KR) ........................ 10-2009-0029886
Jun. 25, 2009 (KR) ........................ 10-2009-0057259

(51) Int. Cl.
*A47L 5/32* (2006.01)
*A47L 9/00* (2006.01)
(Continued)

(52) U.S. Cl.
CPC ................. *A47L 9/00* (2013.01); *A47L 5/225* (2013.01); *A47L 5/30* (2013.01); *A47L 5/32* (2013.01);
(Continued)

(58) Field of Classification Search
CPC ... A47L 5/30; A47L 5/32; A47L 5/225; A47L 9/00; A47L 9/242; F16K 11/00; Y10T 137/86493
(Continued)

(56) References Cited

U.S. PATENT DOCUMENTS 3,300,806 A   1/1967   Ripple
4,573,236 A   3/1986   Dyson
(Continued)

FOREIGN PATENT DOCUMENTS

EP   1 464 267 A2   10/2004
GB   2 342 282 A    4/2000
(Continued)

OTHER PUBLICATIONS

UK Combined Search Report and Examination Report issued on Jun. 21, 2010, in counterpart UK Application No. GB1002914.8 (5 pages, in English).
(Continued)

*Primary Examiner* — David Redding
(74) *Attorney, Agent, or Firm* — NSIP Law (57) ABSTRACT

An apparatus for diverting a fluid flow path automatically diverts a fluid flow path in accordance with inclining of a main body, and includes two or more selectable fluid flow paths through which an external air stream is drawn, a fixed fluid flow path to be selectively connected to one of the selectable fluid flow paths, a path selecting unit to connect the fixed fluid flow path to one of the selectable fluid flow paths, and a driving member to provide a driving force for path selecting of the path selecting unit. If mounted in an external apparatus, the driving member causes the path selecting unit to move and connect to the fixed fluid flow path in accordance with inclining of the external apparatus.

7 Claims, 10 Drawing Sheets (51) Int. Cl.
*A47L 5/22* (2006.01)
*A47L 9/24* (2006.01)
*F16K 11/00* (2006.01)
*A47L 5/30* (2006.01)

(52) U.S. Cl.
CPC .............. *A47L 9/242* (2013.01); *F16K 11/00* (2013.01); *Y10T 137/86493* (2015.04)

(58) Field of Classification Search
IPC .......................................................... A47L 5/32
See application file for complete search history.

(56) References Cited

U.S. PATENT DOCUMENTS

| | | |
|---|---|---|
| 4,809,397 A | 3/1989 | Jacobs et al. |
| 5,189,757 A | 3/1993 | Williams et al. |
| 5,347,678 A | 9/1994 | Williams et al. |
| 5,351,361 A | 10/1994 | Buchtel |
| 5,355,549 A | 10/1994 | Steinberg et al. |
| 5,732,439 A | 3/1998 | Cipolla |
| 6,079,077 A | 6/2000 | Kajihara et al. |
| 6,536,074 B2 | 3/2003 | Boles et al. |
| 6,572,078 B1 * | 6/2003 | Thomson ................ A47L 5/32 137/874 |
| 6,782,585 B1 | 8/2004 | Conrad et al. |
| 6,920,665 B2 | 7/2005 | Tucker |
| 7,213,297 B2 | 5/2007 | Nam et al. |
| 7,533,441 B2 | 5/2009 | Yoo |
| 7,657,966 B1 | 2/2010 | Schwartz |
| 2004/0194250 A1 | 10/2004 | Conrad et al. |
| 2005/0071945 A1 | 4/2005 | Lee |
| 2009/0089959 A1 | 4/2009 | Lee et al. |
| 2009/0089961 A1 | 4/2009 | Kim et al. |
| 2009/0151112 A1 | 6/2009 | Jansen |

FOREIGN PATENT DOCUMENTS

| | | |
|---|---|---|
| GB | 2 402 048 A | 12/2004 |
| GB | 2 416 112 A | 1/2006 |
| GB | 2 453 617 A | 4/2009 |
| GB | 2 461 606 A | 1/2010 |
| KR | 10-0608500 B1 | 8/2006 |
| WO | WO 2006/015309 A2 | 2/2006 |

OTHER PUBLICATIONS

U.S. Appl. No. 12/704,054, filed Feb. 11, 2010, Byung-Jo Lee et al., Samsung Electronics Co., Ltd.
U.S. Appl. No. 14/249,113, filed Apr. 9, 2014, Byung-Jo Lee et al., Samsung Electronics Co., Ltd.

* cited by examiner

APPARATUS FOR DIVERTING FLUID FLOW PATH

CROSS-REFERENCE TO RELATED APPLICATIONS

This application is a continuation of application Ser. No. 12/704,054 filed on Feb. 11, 2010, now U.S. Pat. No. 8,789,234 issued on Jul. 29, 2014, and claims the benefit under 35 USC 119(a) of Korean Patent Application Nos. 10-2009-0029886 filed on Apr. 7, 2009, and 10-2009-0057259 filed on Jun. 25, 2009, in the Korean Intellectual Property Office, the entire disclosures of which are incorporated herein by reference for all purposes.

BACKGROUND

1. Field

The following description generally relates to an apparatus for diverting a fluid flow path based on the inclining of a main body.

2. Description of the Related Art

Generally, an apparatus for diverting a fluid flow path may be adapted for use in a vacuum cleaner, such as an upright type vacuum cleaner, to change a fluid flow path depending on whether the vacuum cleaner is operated to clean a floor using a brush assembly or to clean a narrow areas using a hose nozzle, so that air stream is drawn into the brush assembly or the hose nozzle.

Examples of conventional apparatuses for changing fluid flow path are addressed in Korean Registered Patent No. 10-608500, U.S. Pat. No. 6,920,665, U.S. Pat. No. 5,732,439, and U.S. Pat. No. 6,536,074, which pertain to changing a fluid flow path by rotating a plate type valve member using a cam. Additionally, U.S. Pat. No. 6,782,585 is directed to a ball joint to change a fluid flow path, and WIPO Publication No. WO 2006/015309 relates to a fluid flow path diverting apparatus which changes a fluid flow path by moving a position of a switch hose connector using a manually-operated lever.

However, the above described apparatuses for diverting a fluid flow path have shortcomings. For example, a path diverting apparatus using a plate type valve member diverts a fluid flow path by blocking the fluid flow paths within a space where two paths are connected to each other. In this case, it may be difficult to completely block the two paths from each other. Additionally, the plate member frequently fails to block a path completely as it is a planar plate, resulting in deteriorated fluid pressure. Such pressure decrease is more severe if an elastic member to rotate the plate type valve member is aged by long use and unable to provide a satisfactory performance.

In a path diverting apparatus having a ball joint, the ball joint and a surface contacting the ball joint wear out over time, due to the weight of the ball joint being transmitted to the main body. Additionally, since the paths are not completely separated from each other, if air leaks through the worn-out surface, the path diverting apparatus suffers the same problem as that of the plate type valve member, that is, the decrease of fluid pressure.

In a path diverting apparatus such as the one described in WIPO Publication No. WO 2006/015309, a user has to divert a lever by hand to change the position of a switch connector, resulting in an inconvenience to the user.

Furthermore, since the conventional path diverting apparatuses such as those described in the above-mentioned publications or patents incorporate complicated structures, many parts and separate screws, bolts, or other fasteners may be required, assembling of the product is difficult, and manufacturing cost is expensive.

SUMMARY

In one general aspect, there is provided an apparatus for diverting a fluid flow path, comprising two or more selectable fluid flow paths through which an external air stream is introduced, a fixed fluid flow path to be selectively connected to one of the selectable fluid flow paths, a path selecting unit to connect the fixed fluid flow path to one of the selectable fluid flow paths, and a driving member configured to provide a driving force for path selecting of the path selecting unit. The driving member, upon application of the driving force, causes the path selecting unit to move to and connect to the fixed fluid flow path.

The path selecting unit may include a path selecting tube to selectively connect the fixed fluid flow path to one of the selectable fluid flow paths, a cam formed on the path selecting tube, the cam including a hinge hole to be engaged with a hinge protrusion, and a cam groove to receive a driving protrusion of the driving member, a connecting tube to connect an inlet of the fixed fluid flow path and an outlet of the fluid flow paths, and an elastic member to provide the path selecting tube with a recovery force.

The connecting tube may include a telescopic member.

The driving member may be moved upward and downward in accordance with inclining of an external apparatus in which the apparatus for diverting the fluid flow path is mounted.

The driving member may include a driving protrusion formed on an upper portion to be engaged with a cam groove of the path selecting unit, and a restricting groove formed in a lower portion to receive a restricting protrusion to restrict upward and downward motion of the driving member. A lower end of the driving member may be exposed outside the apparatus for diverting the fluid flow path.

The apparatus for diverting a fluid flow path may further comprise a guide member to support so that the selectable fluid flow paths and the path selecting unit divert the fluid flow path.

The guide member may fix outlets of the selectable fluid flow paths in a fluidly connected state with outside, and may be formed as a curved plate to slidably support the path selecting unit to selectively connect to the outlets of the selectable fluid flow paths.

The apparatus for diverting a fluid flow path may further include a casing including a casing tube having the guide member, and a casing cover to movably support the driving member and be connected to a pierced side of the casing tube.

The casing cover may include a restricting protrusion and a hinge protrusion formed on one side, in which the restricting protrusion is inserted into a restricting groove of the driving member and the hinge protrusion is inserted into a hinge hole of a cam formed on the path selecting unit.

The path selecting unit may include a cam rotating in accordance with the upward and downward motion of the driving member, an elastic member to provide the cam with a rotary recovery force, and a path selecting member having a shielding area to accommodate one of the two or more selectable fluid flow paths therein in accordance with the rotation of the cam and block the fluid flow path.

The path selecting member may also include a rotary axis connected to the cam, and a first shielding plate and a second shielding plate connected to the rotary axis to form the shielding area.

A sealing member may be connected to an outer circumference of the first shielding plate and the second shielding plate.

The apparatus for diverting a fluid flow may further include a casing which includes a casing tube formed on an area between the selectable fluid flow paths and having a path partitioning wall to block the fluid flow path located in the shielding area in cooperation with the first shielding plate and the second shielding plate.

The casing may further include a shielding surface which includes a first supporting jaw and a second supporting jaw formed thereon to contact one side of the first shielding plate or the second shielding plate to thereby isolate an interior of the shielding area from an exterior.

The first and second supporting jaws may restrict the rotary motion of the first shielding plate or the second shielding plate.

The apparatus for diverting a fluid flow may further include an arc-shaped wall formed in a middle area between the first supporting jaw and the second supporting jaw, to rotatably support the rotary axis of the path selecting member.

The shielding surface may have an axis hole formed on an area where the first supporting jaw and the second supporting jaw meet, for an axis-coupling of the cam and the path selecting member.

In another aspect, there is provided an apparatus for diverting a fluid flow path, the apparatus mounted in an external apparatus, and comprising two or more selectable fluid flow paths through which an external air stream is introduced, a fixed fluid flow path to be selectively connected to one of the selectable fluid flow paths, a path selecting unit to connect the fixed fluid flow path to one of the selectable fluid flow paths, and a driving member to provide a driving force for path selecting of the path selecting unit. The driving member causes the path selecting unit to move to and connect to the fixed fluid flow path in accordance with inclining of the external apparatus.

The driving member is positioned such that it may be in contact with a portion of external apparatus, wherein the inclining of the external apparatus causes the driving member to move in a predetermined direction, which in turn, causes the path selecting to move.

The external apparatus may be a vacuum cleaner.

Other features and aspects will be apparent from the following detailed description, the drawings and the claims.

BRIEF DESCRIPTION OF THE DRAWINGS

FIG. 4 is a cross section view illustrating an example of a fluid flow path of the path diverting apparatus 200 during a cleaning operation of the upright type vacuum cleaner 100 in which the main body is in an upright position, using a hose nozzle 130a.

FIG. 7 is a view illustrating an example of the state of a driving member 380 and a cam 360 of the path diverting apparatus 300 during a cleaning operation of the upright type vacuum cleaner 100 of FIG. 3 in which the main body 110 is in an upright state, using a hose nozzle 130a.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 1:
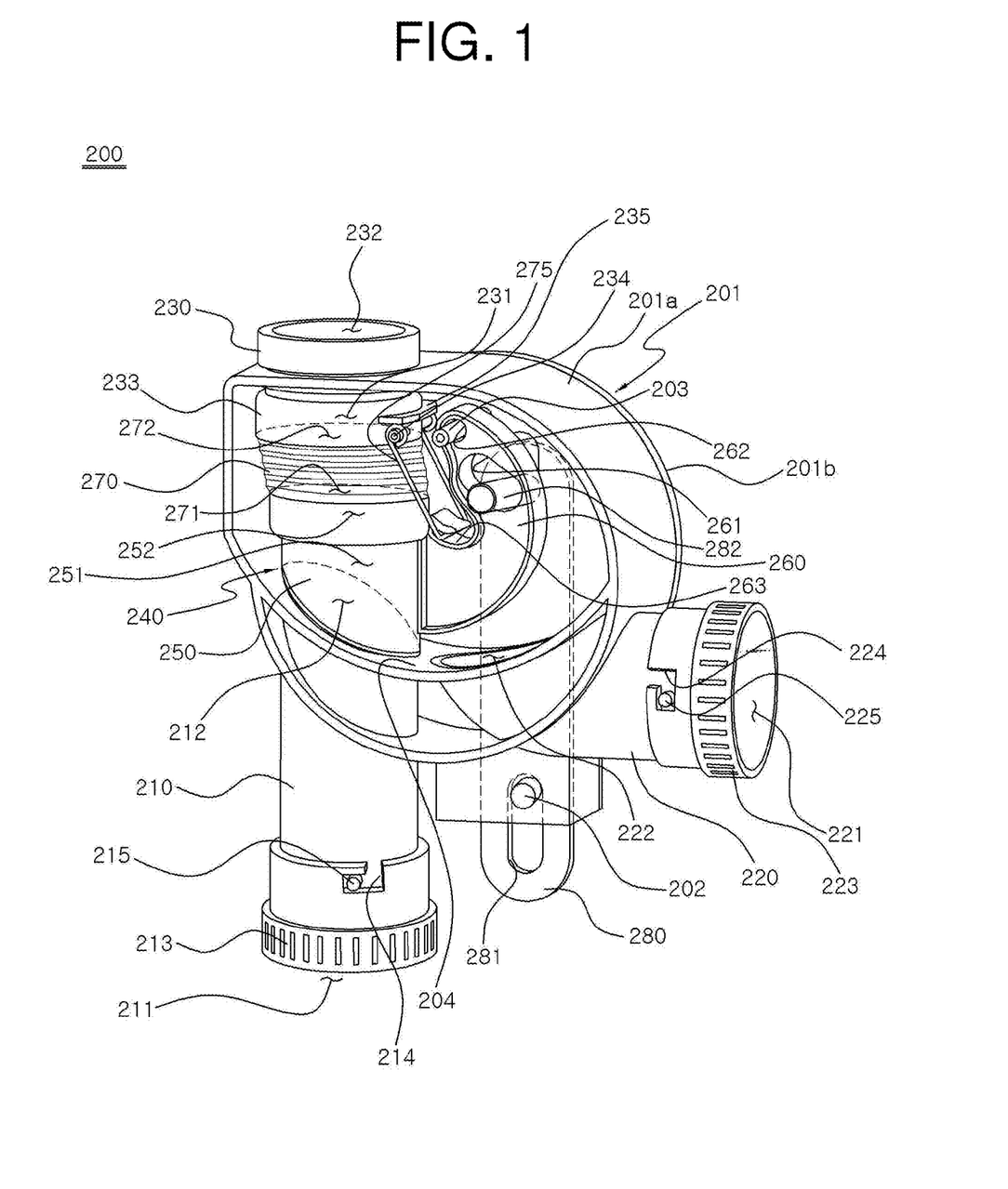
FIG. 1 is a perspective view illustrating an example of a path diverting apparatus 200.
Figure 2:
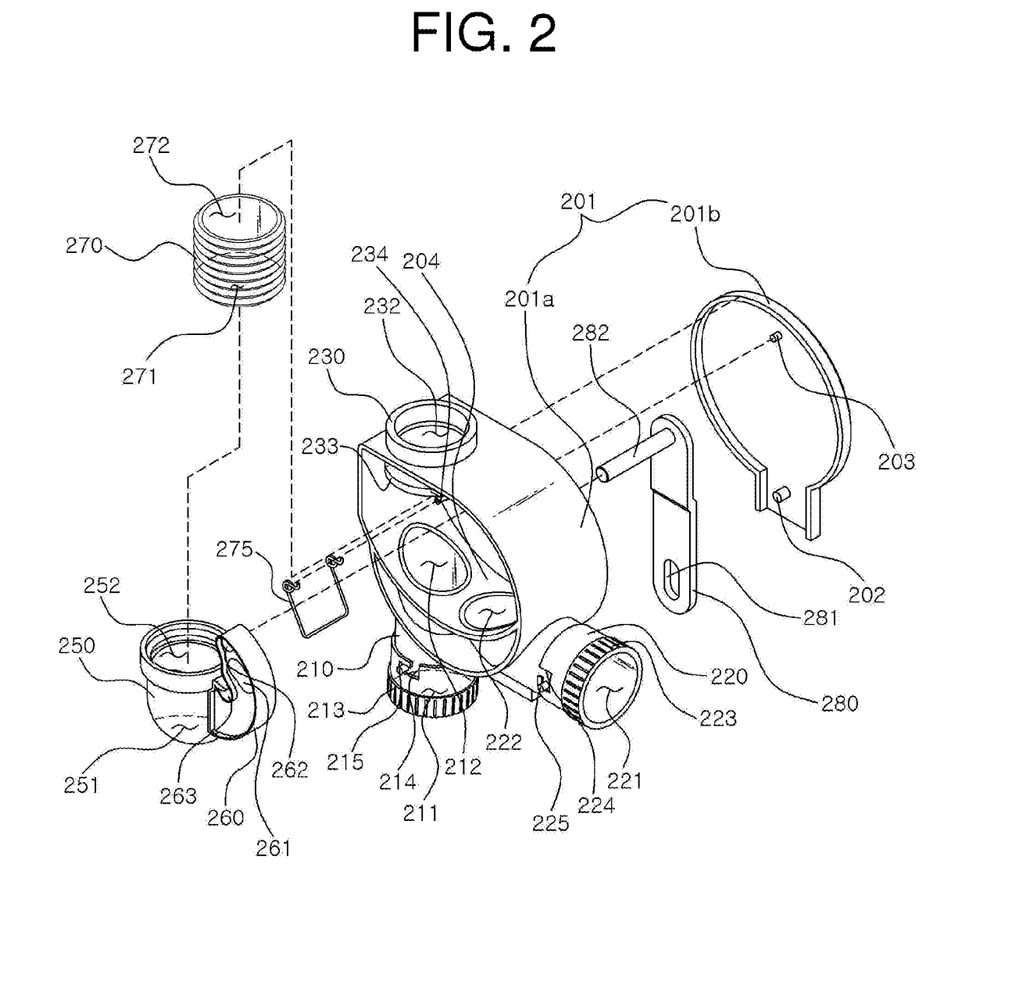
FIG. 2 is an exploded perspective view illustrating an example of the path diverting apparatus 200 of FIG. 1.

FIG. 1 illustrates an example of a path diverting apparatus 200. FIG. 2 illustrates an example of the path diverting apparatus 200 of FIG. 1 in an exploded perspective.

The path diverting apparatus 200 includes a first path 210, a second path 220, a third path 230, a path selecting unit 240, a driving member 280, and a casing 201 to fixedly support the first to third paths 210, 220, 230, and to movably support the path selecting unit 240 and the driving member 280 so that the path selecting unit 240 and the driving member 280 may move upward and downward. Referring to FIGS. 1 and 2, for example, the first and second paths 210, 220 correspond to a selectable fluid flow path, and the third path 230 corresponds to a fixed fluid flow path.

The casing 201 includes a casing tube 201a to fix the first to third paths 210, 220, 230, and a casing cover 201b to movably support the driving member 280 so that the driving member 280 is moved upward and downward. The casing cover 201b is connected to an open side of the casing tube 201a.

The casing tube 201a fixes the first to third paths 210, 220, 230 in a manner in which outlets 212, 222 of the first and second paths 210, 220, and an inlet 231 of the third path 230 are placed inside the casing tube 201a, while inlets 211, 221 of the first and second paths 210, 220 and an outlet 232 of the third path 230 are placed outside the casing tube 201a.

The casing tube 201a includes a guide member 204 formed therein in a curved shape. Preferably, the guide member 204 may be formed as a plate in a circular arc shape, with both sides fixed to sidewalls of the casing tube 201a. The guide member 204 is fixed in place so that the outlets 212, 222 of the first and second paths 210, 220 are connected fluidly with the outside through the lower surface of the guide member 240, and the upper surface of the guide member 240 supports a path selecting tube 250 of the path selecting unit 240 in a manner in which an inlet 251 of the path selecting tube 250 is slid in contact therealong.

The casing cover 201b includes a restricting protrusion 202 formed on a side to be inserted into a restricting groove 281 of the driving member 280, and a hinge protrusion 203 formed on an upper portion to be engaged with a hinge hole 262 of a cam 260 of the path selecting unit 240.

The first and second paths 210, 220 form a fluid flow path through which an external air stream may be introduced to form an internal air stream, and the third path 230 is selectively connected to the first path 210 or the second path 220 to form a fluid flow path through which the internal air stream is discharged.

Accordingly, the first to third paths 210, 220, 230 are employed in a tubular form having inlets 211, 221, 231 and outlets 212, 222, 232. The inlets 211, 221 of the first and second paths 210, 220 are connected to an external air suction body, such as a brush assembly or hose nozzle, through a first tube connecting member 213 or a second tube connecting member 223. The first tube connecting member 213 or the second tube connecting member 223 connects an external tube to the inlets 211, 221 of the first and second paths 210, 220 by any suitable fastening method, for example, by fastening first and second fixing protrusions 215, 225 of the first and second paths 210, 220 to first and second fixing holes 214, 224. However, the fastening methods are not limited to this example. The outlets 212, 222 of the first and second paths 210, 220 are fixedly connected to the guide member 204, in a fluid communication with the outside. The third path 230 is fixed to the casing tube 201a so that the inlet 231 is placed inside the casing tube 201a, while the outlet 232 is placed outside the casing tube 201a.

The path selecting unit 240 includes the path selecting tube 250, the cam 260, a connecting tube 270, and an elastic member 275. The path selecting unit connects the third path 230 selectively to the first or the second path 210, 220, by rotating the path selecting tube 250 with the driving member 280 and the cam 260.

To perform the abovementioned function, the inlet 251 of the path selecting tube 250 has a section in an outwardly-rounded arc shape so as to be slid along an upper surface of the guide member 204 which has a section in an inwardly-rounded arc shape. An outlet 252 of the path selecting tube 250 is connected fluidly to the third path 230 through the connecting tube 270. The connecting tube 270 may be connected in a variety of conventional manners. By way of example, an inlet 271 and an outlet 272 of the connecting tube 270 may be connected to the path selecting tube 250 and the third path 230, and securely joined with each other by externally compressing the connected portion with a tube joint 233. However, the connected tube may be connected in other suitable manners as well. The connecting tube 270 may preferably be formed, for example, as a telescopic tube such as a bellows tube. However, the connecting tube is not limited to such a configuration.

The cam 260 includes the hinge hole 262 formed in an upper portion to receive the hinge protrusion 203 formed on the casing cover 201b, and a cam groove 261 formed adjacent to the hinge hole 262 to receive a driving protrusion 282 of the driving member 280. The cam 260 is formed on a side of the path selecting tube 250. The cam groove 261 may desirably be formed in an oblong or oval shape so as to transform upward and downward motion of the driving protrusion 282 inserted therein into a rotary motion about the hinge hole 262 of the cam 260, without interrupting the upward and downward motion of the driving protrusion 282.

One end of the elastic member 275 is fixed to the path selecting unit 240, while the other end is fixed by an elastic member fixing protrusion 234 and a locking protrusion 235. FIGS. 1 and 2 illustrate examples showing the elastic member 275 locked in an elastic member locking hole 263 of the cam 260. Accordingly, the elastic member 275 may provide an elastic recovery force to return the path selecting tube 250 toward the first path 210 after the path selecting tube 250 is rotated to the second path 220.

The driving member 280 includes the restricting groove 281 formed in the lower portion to receive the restricting protrusion 202 formed on the casing cover 201b, and the driving protrusion 282 formed on the upper portion to be inserted into the cam groove 261. Although FIGS. 1 and 2 illustrate the driving member 280 in a bar configuration, this should not be construed as limiting, and accordingly, the driving member 280 may be formed in other shapes and configurations. The driving member 280 is suspended on the cam 260 by the driving protrusion 282, and connected to the path selecting unit 240 in a manner in which a lower end thereof is protruded out of the path diverting apparatus 200. When the driving member 280 with the above-explained structure is connected to an apparatus ('external apparatus') in which the path diverting apparatus 200 is employed, the lower end of the driving member 280 is brought into contact with the external apparatus. The lower end in contact with the external apparatus may cause the driving member 280 to move upward and downward relative to the main body of the external apparatus, in accordance with inclining of the main body. The distance of upward and downward motion of the driving member 280 may be restricted by the restricting protrusion 202 and the restricting groove 281 formed on the casing cover 201b. To this end, the restricting groove 281 has a vertical width to restrict the motion of the driving member 280 so that the driving member 280 is rotated within an area between the outlet 212 of the first path 210 and the outlet 222 of the second path 220.

The path diverting apparatus 200 of FIGS. 1 and 2 is mounted in the main body so that the lower end of the driving member 280 may be brought into contact with the lower body of the external apparatus requiring path diversion, in accordance with inclining of the main body. As the main body is inclined, the driving member 280 in contact with the lower body is moved upward and downward in relation to the main body, to thereby rotate the cam 260. The rotating cam 260 connects the path selecting tube 250 to the first path 210 or the second path 220, to thereby form a path connecting the third path 230 to the first path 210 or the second path 220.

Figure 3:
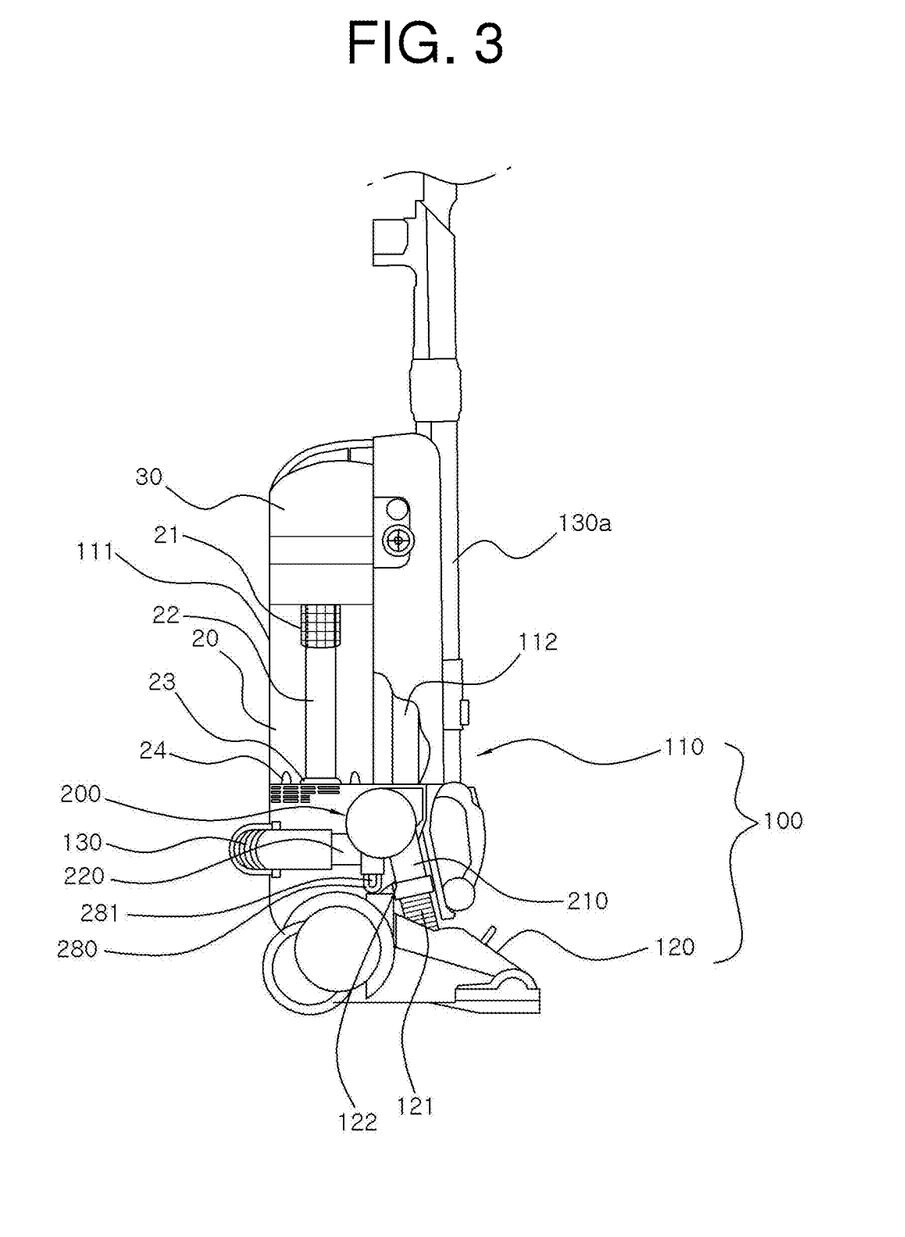
FIG. 3 is a view illustrating an example of an upright type vacuum cleaner 100 employing the path diverting apparatus 200.
Figure 4:
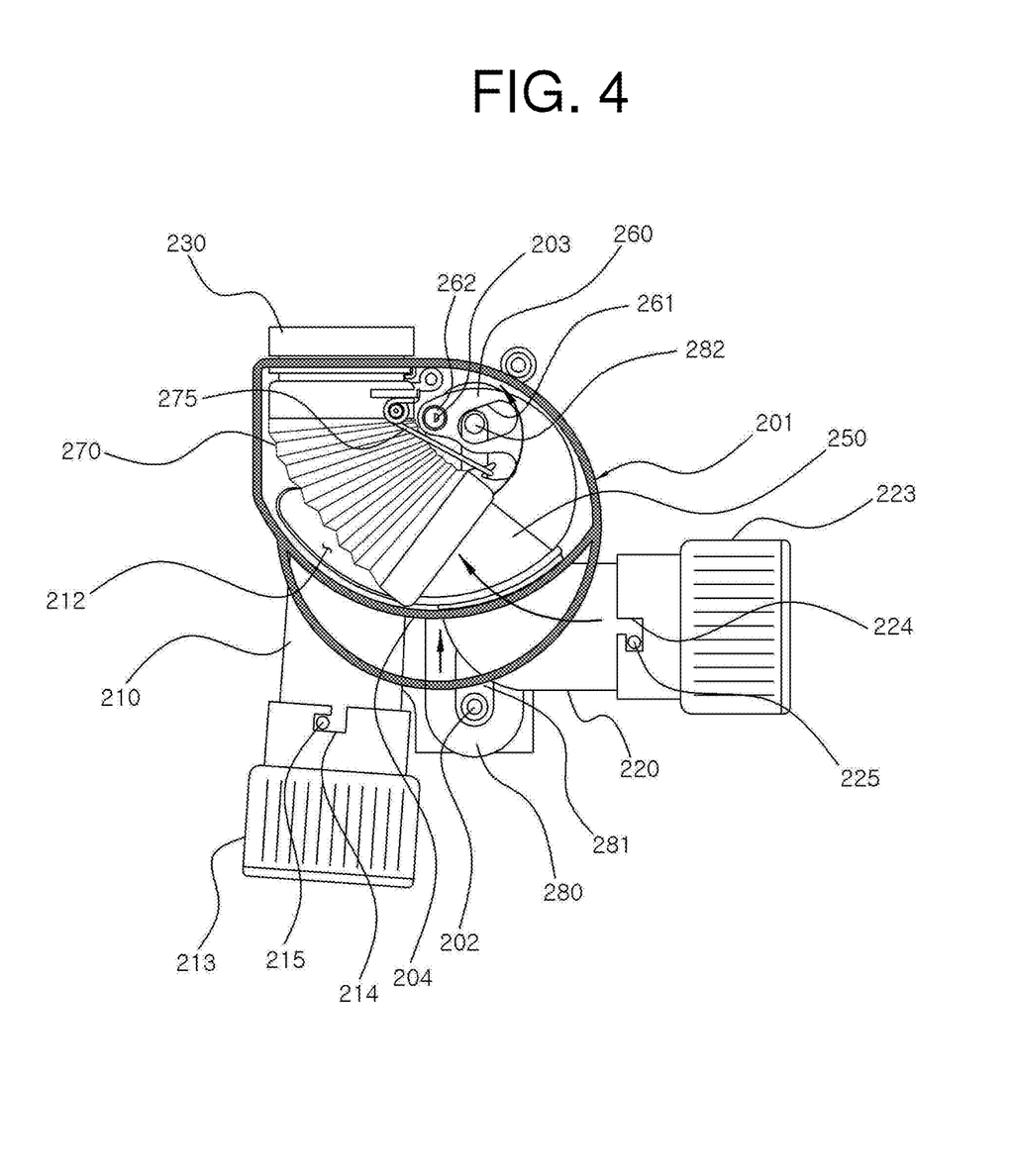
Figure 5:
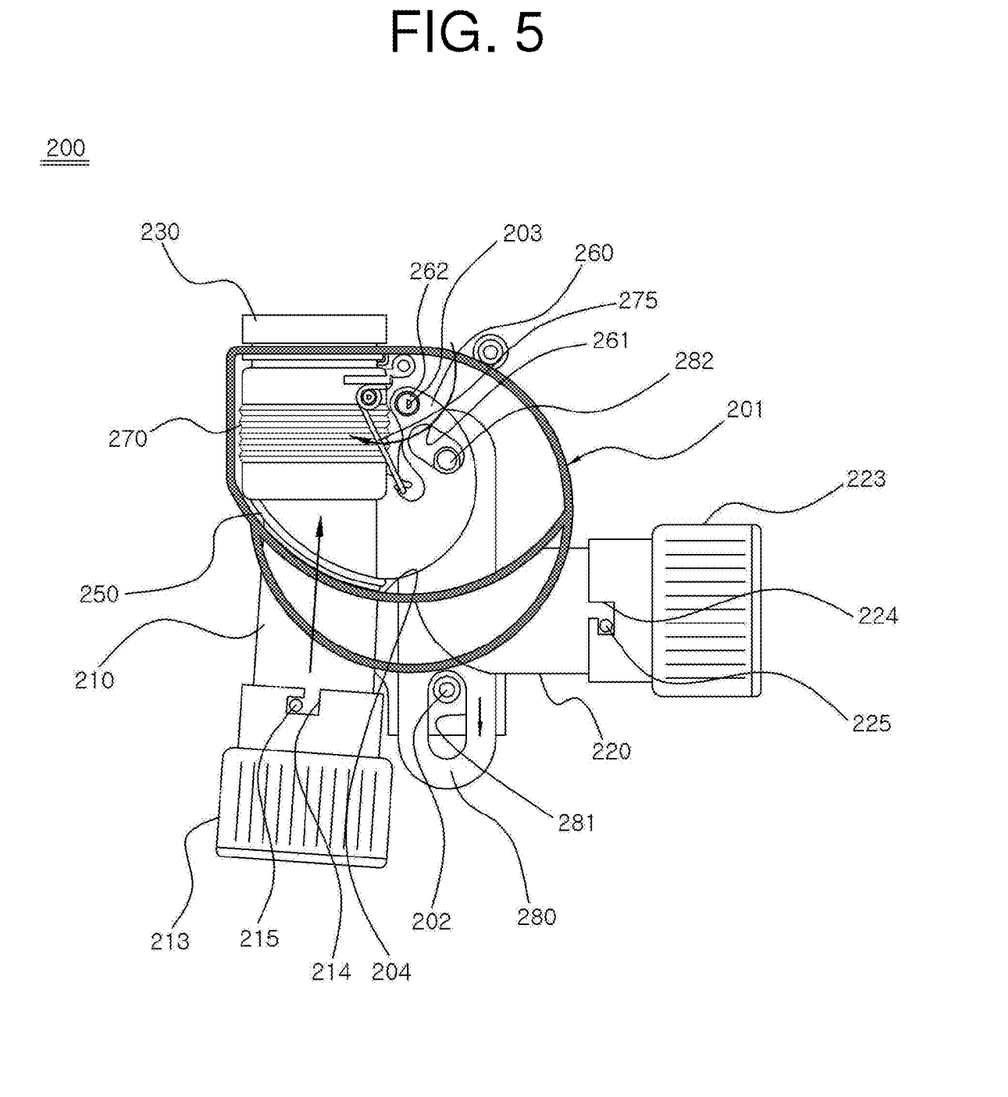
FIG. 5 is a cross section view illustrating an example of a fluid flow path of the path diverting apparatus 200 during a cleaning operation of the upright type vacuum cleaner 100 in which the main body is in an inclined position, using a brush assembly 120.

FIG. 3 illustrates an example of an upright type vacuum cleaner 100 employing a path diverting apparatus 200. FIG. 4 illustrates an example of a fluid flow path of the path diverting apparatus 200, in a cross sectional view, during a cleaning operation of the upright type vacuum cleaner 100 in which the main body is in an upright position, using a hose nozzle 130a. FIG. 5 illustrates an example of a fluid flow path of the path diverting apparatus 200, in a cross sectional view, during a cleaning operation of the upright type vacuum cleaner 100 in which the main body is in an inclined position, using a brush assembly 120.

The upright type vacuum cleaner 100 generally includes the inclinable main body 110, the brush assembly 120, and a hose 130 having a hose nozzle 130a to clean a narrow area.

The brush assembly rotatably supports the main body 110 and may draw in an air stream including dust from a surface being cleaned.

The main body 110 houses a dust separating apparatus 111 therein, and has the hose nozzle 130a formed outside. As mentioned above, the main body 110 is inclinable, that is, rotatable relative to the brush assembly 120. The dust separating apparatus 111 includes a first separating portion 20 having a grill 21, an air discharge guiding tube 23, an elastic sealing member 22, and a second separating portion 30 having a cyclone therein.

The brush assembly 120 rotatably supports the main body 110, and is moved to draw in an external air stream including foreign substances such as dust from a surface being cleaned.

In the example of the upright type vacuum cleaner 100 of FIG. 3 with the structure explained above, the path diverting apparatus 200 is installed at a position where the hose 130, the brush assembly 120 and a dust separating apparatus inlet pipe 112 connected to the dust separating apparatus 111 cross, to selectively divert a path between a path to draw in an air stream from the brush assembly 120 to the dust separating apparatus 111 or a path to draw in an air stream from the hose 130 to the dust separating apparatus 111.

The first path 210 of the path diverting apparatus 200 is connected to the brush assembly 120 through a telescopic brush connecting tube 121. The second path 220 is connected to the hose 130 which is connected to the hose nozzle 130a. The third path 230 (not shown in FIG. 3) is connected to the dust separating apparatus inlet pipe 112. The lower end of the driving member 280 may be brought into contact with a contacting portion 122 of the brush assembly 120.

At this state, if the cleaning operation is performed using the hose nozzle 130a, the main body 110 stands in an upright position with respect to the brush assembly 120. If the main body 110 stands upright, as indicated by a short upwardly-arrowed line in FIG. 4, the driving member 280 is moved upward with respect to the main body 110, by the contacting portion 122 of the brush assembly 120. The upward movement of the driving member 280 with respect to the main body causes the cam 260 to rotate about the hinge protrusion 203 in a direction indicated by an arrowed curve in an arc shape in a counterclockwise direction of FIG. 4. Accordingly, as the path selecting tube 250 is moved to and connected to the second path 220, the third path 230 is connected to the second path 220. The elastic member 275 provides a recovery force to return the path selecting tube 250 toward the first path 210. The recovery force is accumulated as the lower end, which is engaged with the elastic member locking hole 263, is rotated about the elastic member fixing protrusion 234 along the path selecting tube 250. Through the path formed as explained above, the external air stream, which is drawn through the hose nozzle 130a, is introduced into the dust separating apparatus 111.

Meanwhile, if the brush assembly 120 is used in the cleaning operation, the main body 110 is inclined backward. If the main body 110 is inclined backward, the driving member 280 loses upward support by the contacting portion 122. When the driving member 280 loses upward support, the accumulated elastic recovery force of the elastic member 275 causes the path selecting tube 250 to move toward the first path 210 in a direction indicated by a clockwise arrowed curve of FIG. 5, to thereby connect the path selecting tube 250 to the first path 210. At this time, the driving member 280 is moved downward with respect to the main body 110 according to the rotation of the cam 260. Through the path formed as explained above, the air stream including dust that is drawn through the brush assembly 120 may be introduced into the dust separating apparatus 111.

FIGS. 6 to 10 illustrate an example of a path diverting apparatus 300 according to a second embodiment.

Figure 6:
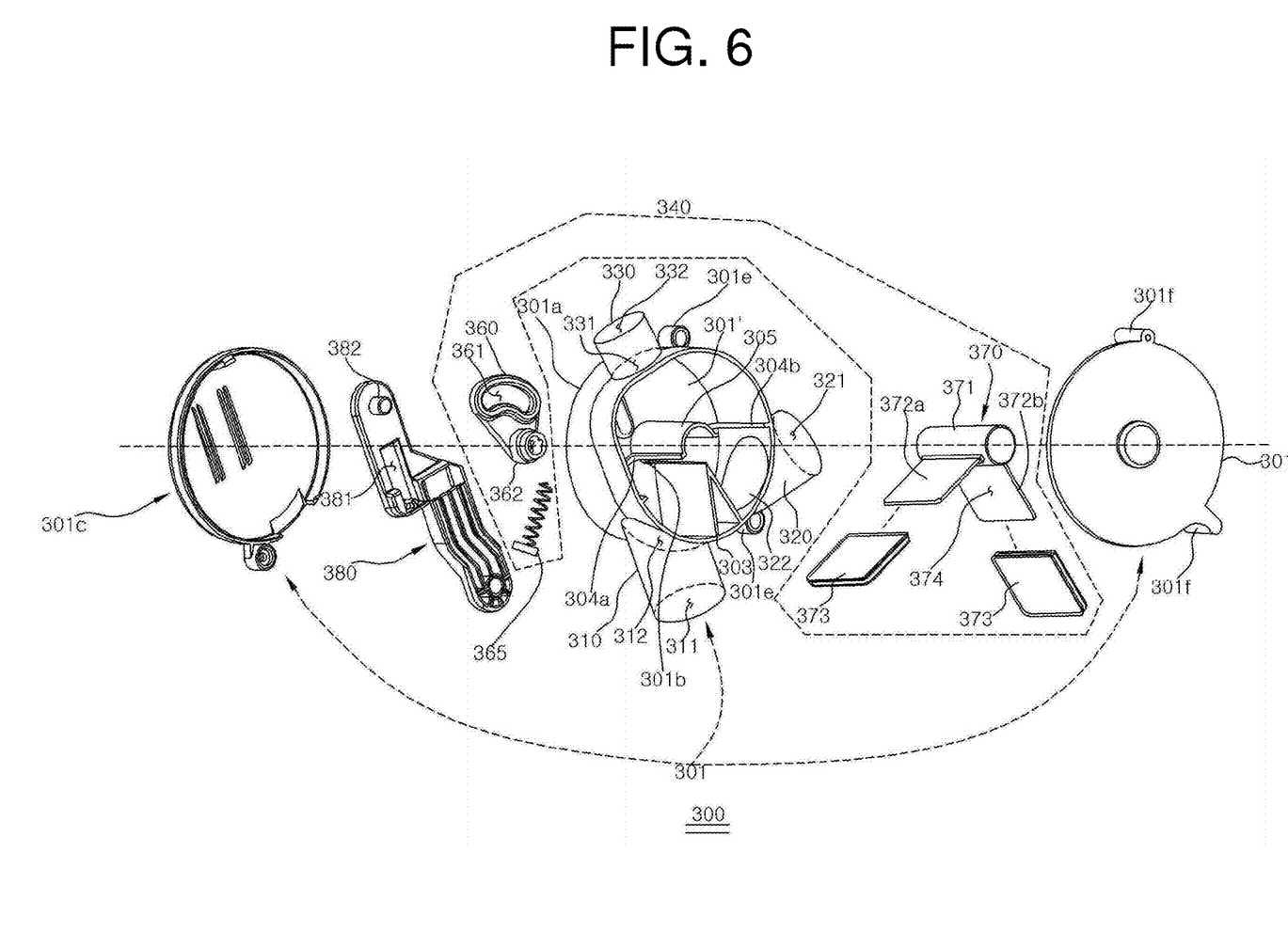
FIG. 6 is a perspective view illustrating an example of a path diverting apparatus 300 according to a second embodiment.

More specifically, FIG. 6 illustrates, in a perspective view, an example of a path diverting apparatus 300 according to a second embodiment.

Figure 7:
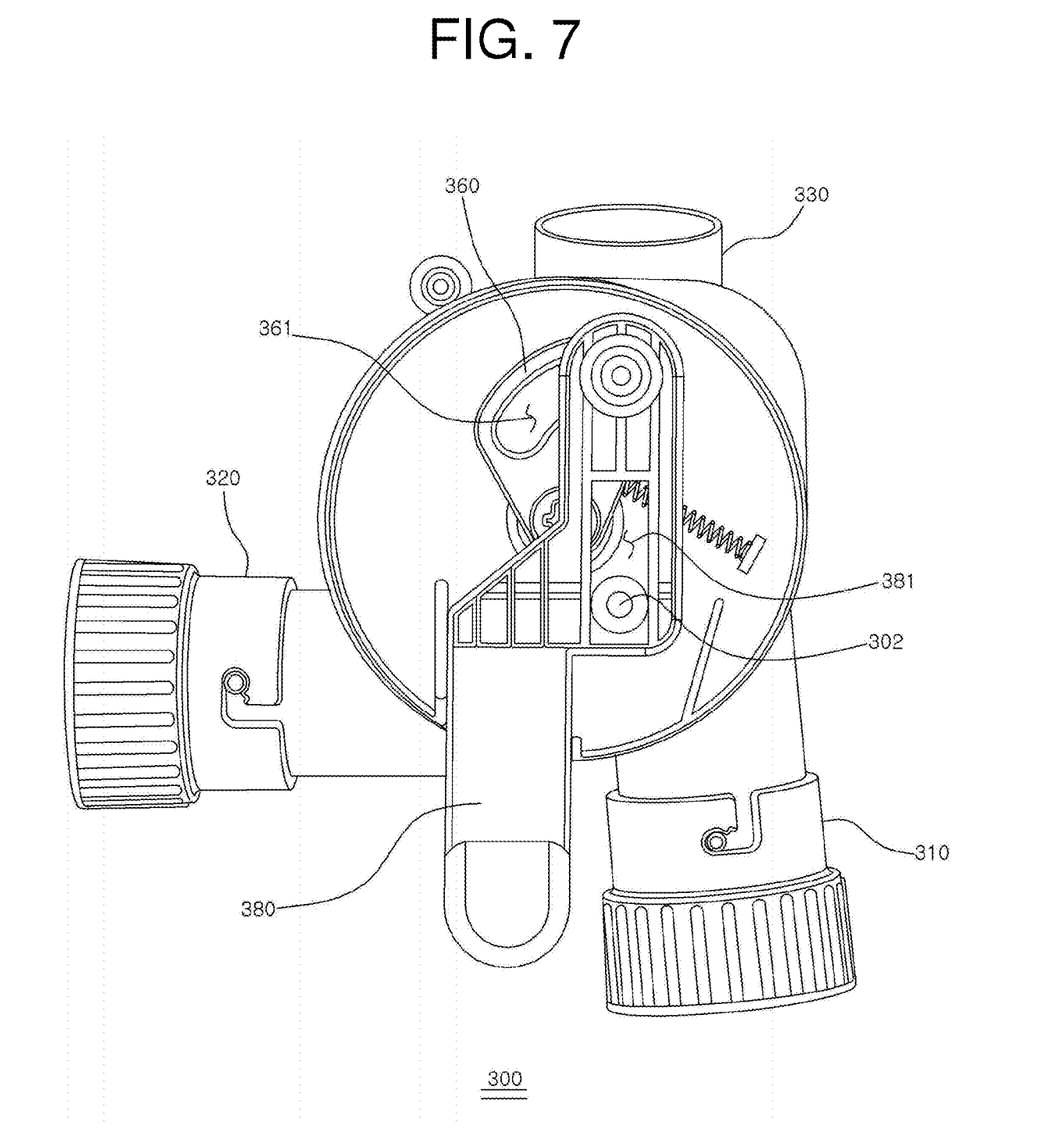
Figure 8:
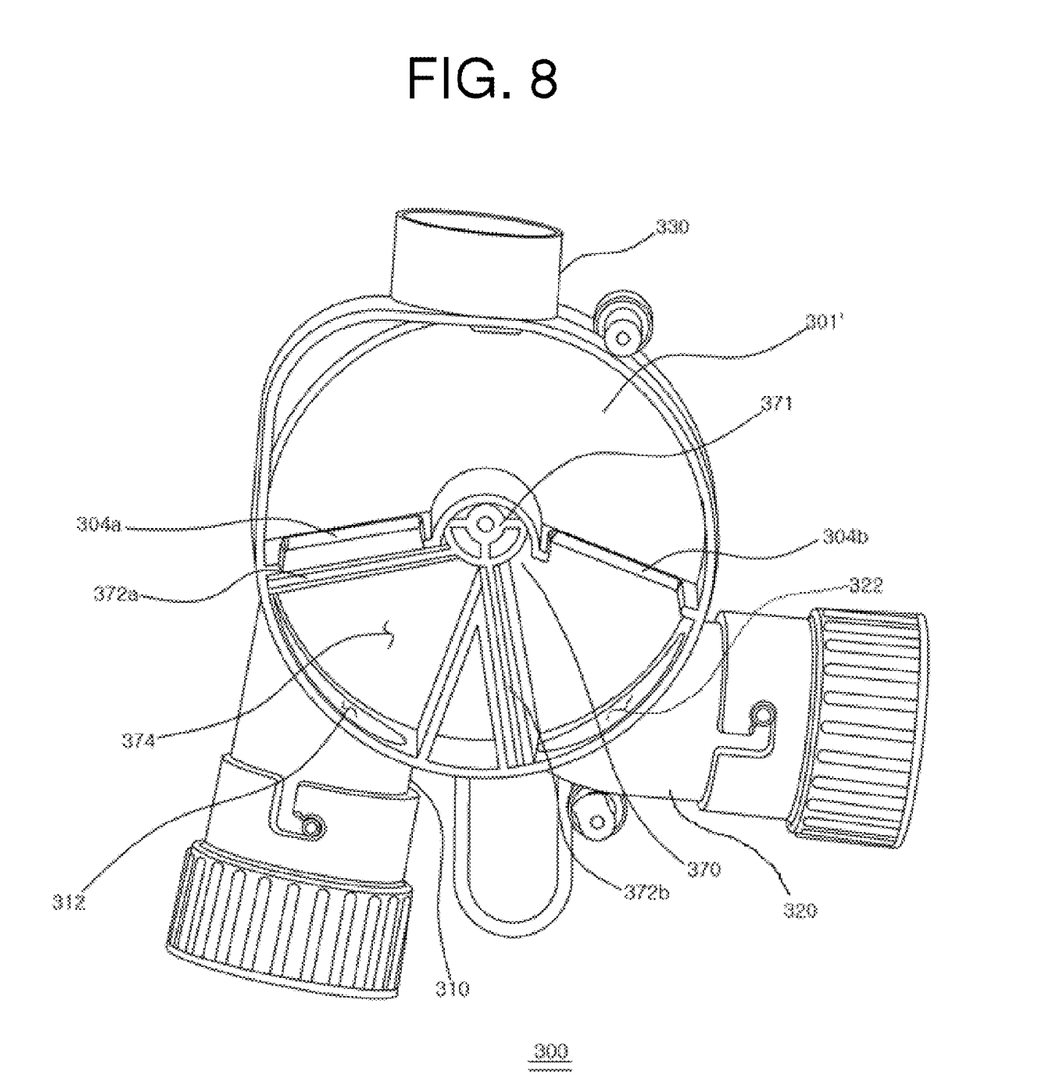
FIG. 8 is a view illustrating an example of a path diverting state of a path selecting unit 340.

FIG. 7 illustrates an example of the state of a driving member 380 and a cam 360 of a path diverting apparatus 300 during a cleaning operation of an upright type vacuum cleaner 100 of FIG. 3 in which the main body 110 is in an upright state, using a hose nozzle 130a. FIG. 8 illustrates an example of a path diverting state of a path selecting unit 340 (FIG. 6).

Figure 9:
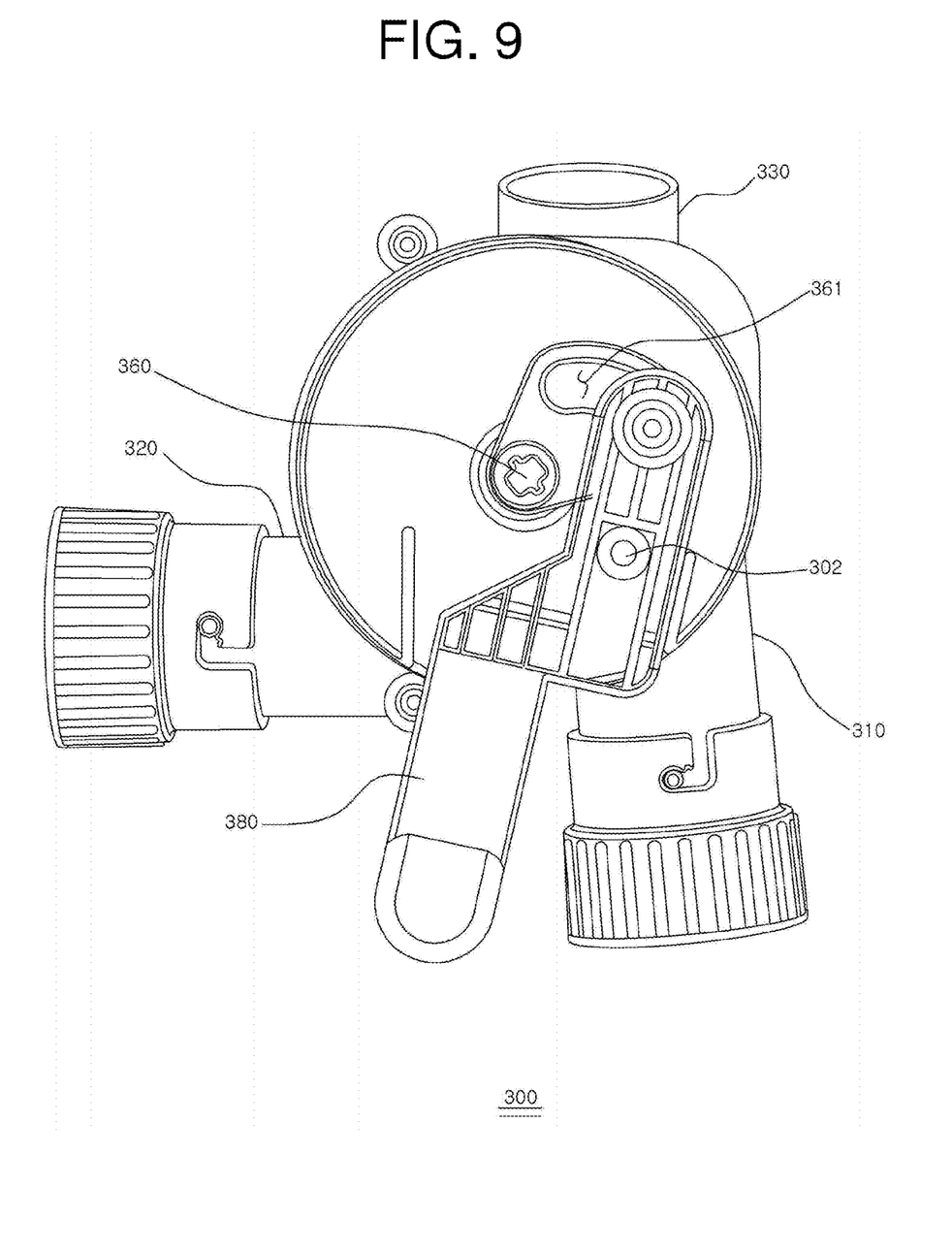
FIG. 9 is a view illustrating an example of the state of a driving member 380 and a cam 360 of a path diverting apparatus 300 during a cleaning operation of the upright type vacuum cleaner 100 of FIG. 3 in which the main body 110 is in an inclined state, using the brush assembly 120.
Figure 10:
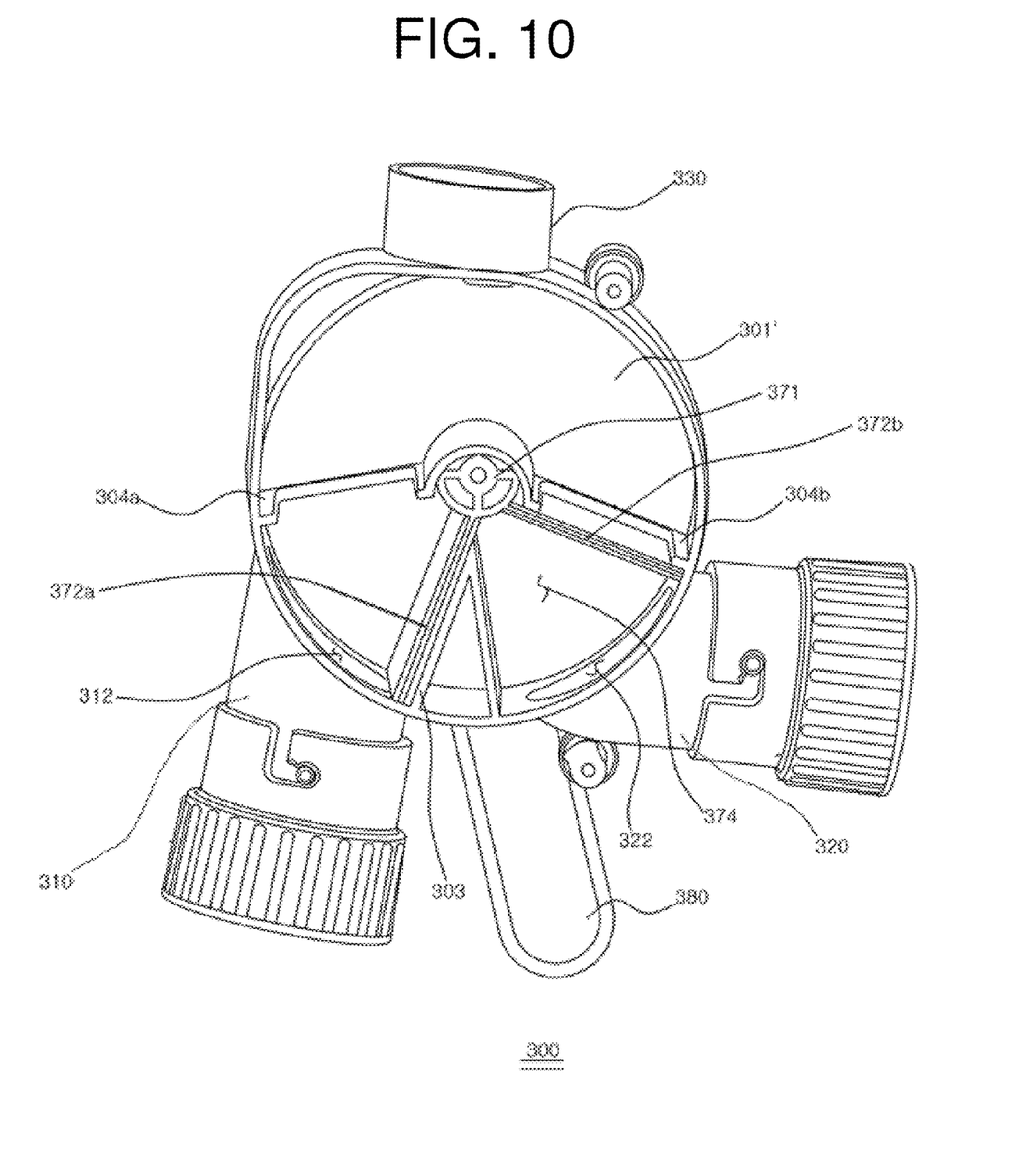
FIG. 10 is a view illustrating an example of a path diverting state of the path selecting unit 340.

FIG. 9 illustrates an example of the state of the driving member 380 and the cam 360 of the path diverting apparatus 300 during a cleaning operation of the upright type vacuum cleaner 100 of FIG. 3 in which the main body 110 is in an inclined state, using the brush assembly 120. FIG. 10 illustrates an example of a path diverting state of the path selecting unit 340.

The structure and operation of the path diverting apparatus 300 according to the second embodiment are explained below with reference to FIGS. 6 to 10 as illustrative examples.

The path diverting apparatus 300 according to the second embodiment includes a casing 301, a path selecting unit 340, and a driving member 380.

The casing 301 includes a casing tube 301a, a front cover 301c, and a rear cover 301d, to fix the first to third paths 310, 320, 330 therein.

The casing tube 301a may be formed as a cylindrical tube, for example, and includes the first to third paths 310, 320, 330, the first and second supporting jaws 304a, 304b, a shielding surface 301' having an axis hole 301b formed therein, and a path partitioning wall 303.

The first and second paths 310, 320 form a fluid flow path through which external air stream may be drawn. The third path 330 is selectively connected to the first path 310 or the second path 320 to form a fluid flow path through which internal air stream may be discharged. To this end, the first to third paths 310, 320, 330 are formed as tubes each having the inlets 311, 321, 331 and the outlets 312, 322, 332.

The first to third paths 310, 320, 330 are connected to the casing tube 301a in a manner in which the outlets 312, 322 of the first and second paths 310, 320, and the inlet 331 of the third path 330 are positioned inside the casing tube 301a, while the inlets 311, 321 of the first and second paths 310, 320, and the outlet 332 of the third path 330 are positioned outside the casing tube 301a.

Similar to the first embodiment detailed above, the first and second paths 310, 320 correspond to the selectable fluid flow paths and the third path 330 corresponds to the fixed fluid flow path according to the second embodiment.

Referring to the examples illustrated in FIGS. 7 and 9, the shielding surface 301' includes a restricting protrusion 302 formed on an outer surface of the casing 301, and the axis hole 301b formed at the center. The shielding surface 301' also includes a first supporting jaw 304a and a second supporting jaw 304b extended from an inner surface of the casing 310 to protrude from the axis hole 301b to a predetermined height. The first and second supporting jaws 304a, 304b are distanced from each other at a predetermined angle, and extended to the outer circumference of the shielding surface 301'. An arc-shaped wall 305 is formed on a middle area between the first and second supporting jaws 304a, 304b. The angle between the first and second supporting jaws 304a, 304b may desirably be two times as large as an angle between first and second shielding plates 372a, 372b of a path selecting member 370 which is explained below.

The path partitioning wall 303 is extended from an area between the outlets 312, 322 of the first and second paths 310, 320 of the casing tube 301a to the axis hole 301b of the casing tube 301a to isolate the first path 310 and the second path 320 from each other.

The front cover 301c is connected to the casing tube 301a on the outer surface of the shielding surface 301', and the rear cover 301d is connected to an open surface of the casing tube 301a to isolate the inner area of the casing tube 301a from the outer area.

The path selecting unit 340 includes the cam 360, an elastic member 365, and the path selecting member 370.

The cam 360 includes a connecting axis 362 extended from a lower portion which faces the axis hole 301b of the shielding surface 301', and a cam groove 361 formed in the upper portion of the driving member 380 to receive a driving protrusion 382 of the driving member 380 therein.

The elastic member 365 connects the cam 360 to the casing tube 301a to provide the cam 360 with an elastic recovery force.

The path selecting member 370 includes a rotary axis 371, the first shielding plate 372a, the second shielding plate 372b, and a sealing member 373 attached to each of the first and second shielding plates 372a, 372b. The sealing member 373 may desirably be made from an elastic material or other suitable material.

The rotary axis 371 is formed as a cylindrical bar having a length corresponding to an inner width of the casing tube 301a. The connecting axis 362 of the cam 360 is axis-coupled to the section of one side of the rotary axis 371.

The first and second shielding plates 372a, 372b each have a width corresponding to the inner width of the casing tube 301a, and are extended from the rotary axis 371 to the inner surface of the casing tube 301a. The first and second shielding plates 372a, 372b are positioned at a predetermined angle with each other to form a shielding area 374 to accommodate the outlet 312, 322 of the first or second path 310, 320 therein and selectively block the first or second path 310, 320.

The sealing member 373 is attached to the outer circumference of the first and second shielding plates 372a, 372b and is configured to provide air-tightness between the blocked path and the connected path, which are formed as the outlet 312, 322 of the first or second path 310, 320 is received in the shielding area 374.

The driving member 380 includes a restricting groove 381 formed on a lower portion to receive the restricting protrusion 302 formed on the shielding surface 301', and the driving protrusion 382 extended from an upper portion to be inserted into the cam groove 361.

The path diverting apparatus 300 with the above-explained structure according to the second embodiment may be assembled in a manner described below with reference to FIGS. 7 to 10, for example.

The path selecting member 370 having the first and second shielding plates 372a, 372b to which the sealing member 373 is attached, is assembled in the casing tube 301 in a manner in which the path partitioning wall 303 is received in the shielding area 374.

The cam 360 is connected to the path selecting member 370, by being penetrated from outside the casing tube 301a through the axis hole 301b of the connecting axis 362, and connected to the rotary axis 371. The elastic member 365 is connected to a side of the cam 360 and to the casing tube 301a.

Accordingly, the cam 360, the elastic member 365, and the path selecting member 370 are assembled in the manner explained above, to thereby form the path selecting unit 340.

The driving member 380 is movably connected to the cam 360 and the casing tube 301a in upward and downward direction, as the driving protrusion 382 of the driving member 380 is inserted into the cam groove 361, and the restricting protrusion 302 is inserted into the restricting groove 381 formed in the lower portion.

As explained above, after the casing 301, the path selecting unit 340, and the driving member 380 are assembled in place, the front cover 301c is connected to the front of the casing tube 301a to house the cam 360 and the driving member 380 therein. As the rear cover 301d is connected to the casing tube 301a by a female fastening portion 301e and a male fastening portion 301f to seal the open surface of the casing tube 301a, the assembling of the path diverting apparatus 300 is completed.

The path diverting apparatus 300 assembled in the manner explained above may be connected to the vacuum cleaner 100 in a manner in which the lower end of the driving member 380 is brought into contact with the contacting portion 122 of the brush assembly 120 as illustrated in FIG. 3. At this time, the first path 310 is connected to the brush assembly 120 through the telescopic brush connecting tube 121. The second path 320 is connected to the hose 130 to which the hose nozzle 130a is connected. The third path 330 is connected to the dust separating apparatus inlet pipe 112.

The main body 110 stands upright with respect to the brush assembly 120, if the hose nozzle 130a is used in the cleaning operation. If the main body 110 stands upright, as illustrated in FIG. 7, for example, the lower end of the driving member 380 is moved upward by the contacting portion 122 of the brush assembly 120. If the driving member 380 is moved upward, the cam 360 is rotated in a counterclockwise direction with respect to the plane of FIG. 7, by the driving protrusion 382 engaged with the cam groove 361. At this time, the elastic recovery force is accumulated on the elastic member 365 to return the cam 360 in a clockwise direction.

If the cam 360 is rotated counterclockwise, as illustrated in FIG. 8, for example, the path selecting member 370 is rotated (in a clockwise direction in FIG. 8) so that the outlet 312 of the first path 310 is received in the shielding area 374. As a result, the path is diverted. That is, the first path 310 is blocked so that the second path 320 is connected fluidly to the dust separating apparatus 111 of the vacuum cleaner 100.

If the first path 310 is blocked as explained above, the first shielding plate 372a is brought into close contact with the first supporting jaw 304a, and the second shielding plate 372b is brought into close contact with the path partitioning wall 303. At this time, the sealing member 373 seals the area between the first shielding plate 372a and the first supporting jaw 304a and the area between the second shielding plate 372b and the path partitioning wall 303, and may thereby provide air-tightness between the blocked path and the connected path.

Meanwhile, if the brush assembly 120 is used in the cleaning operation, the main body 110 is inclined backward. If the main body 110 is inclined backward, the driving member 380 loses upward support by the contacting portion 122. If the driving member 380 loses the upward support, the accumulated elastic recovery force of the elastic member 365 causes the cam 360 to rotate in the clockwise direction, for example, as illustrated in FIG. 9.

If the cam 360 is rotated in the clockwise direction, as illustrated in FIG. 10, for example, the path selecting member 370, which is axis-coupled to the cam 360, is rotated (in the counterclockwise direction in FIG. 10) so that the outlet 322 of the second path 320 is received in the shielding area 374. As a result, the path is diverted so that the second path 320 is blocked, and the first path 310 is connected fluidly to the dust separating apparatus 111 of the vacuum cleaner 100.

If the second path 320 is blocked as explained above, the first shielding plate 372a is brought into close contact with the path partitioning wall 303, and the second shielding plate 372b is brought into close contact with the second supporting jaw 304b. At this time, the sealing member 373 seals the area between the first shielding plate 372a and the path partitioning wall 303 and the area between the second shielding plate 372b and the second supporting jaw 304b, and may thereby provide air-tightness between the blocked path and the connected path.

Although the path diverting apparatus 200, 300 is described above as being employed in the upright type vacuum cleaner 100 according to the various embodiments, this should not be construed as limiting. Accordingly, the path diverting apparatus 200, 300 may be adapted in a variety of different apparatuses which require diverting of fluid flow paths.

As explained above, since the path diverting apparatus 200, 300 automatically positions the path selecting unit in accordance with inclining of the main body, the path is diverted more easily and conveniently.

Furthermore, since the path selecting unit isolates different paths from each other, decrease of fluid pressure during path diversion may be reduced.

Furthermore, since the respective components may be formed integrally, each component has greater strength, and uses less number of parts. Additionally, extra fasteners such as screw, bolt, or other fasteners are not required. As a result, less complicated manufacture is facilitated. Such reduction of number of required parts and easiness of manufacture bring in reduction of manufacture cost.

Furthermore, the path selecting unit is easy to maintain, since it is possible to repair the path selecting unit by separating the casing cover on one side.

A number of examples of embodiments have been described above. Nevertheless, it will be understood that various modifications may be made. For example, suitable results may be achieved if the described techniques are performed in a different order and/or if components in a described system, architecture, device, circuit, or apparatus are combined in a different manner and/or replaced or supplemented by other components or their equivalents. Accordingly, other implementations are within the scope of the following claims.

What is claimed is:

1. A vacuum cleaner comprising:
   a main body configured to be movable relative to a brush assembly;
   a dust separating apparatus configured to be attached to the main body;
   a first fluid flow path configured to receive an external air stream from the brush assembly;
   a second fluid flow path configured to receive an external air stream from a hose;
   a third fluid flow path configured to discharge either of the external air stream received from the brush assembly and the external air stream received from the hose towards the dust separating apparatus; and
   a path selecting unit comprising:
      an inlet conduit selectively connectable to either of the first fluid flow path and the second fluid flow path;
      an outlet fixedly connected to the third fluid flow path; and
      a cam mechanism configured to move the inlet conduit in response to movement of the main body;
   wherein the cam mechanism comprises a cam connected to the inlet conduit; and
   the cam is configured to rotate about a hole in the cam in response to a change in an inclination of the main body.

2. The vacuum cleaner of claim 1, wherein the path selecting unit is further configured to connect the inlet conduit to the second fluid flow path in response to the main body being moved to a position substantially perpendicular to the brush assembly.

3. The vacuum cleaner of claim 2, wherein the path selecting unit is further configured to connect the inlet conduit to the first fluid flow path in response to the main body being moved to a position not substantially perpendicular to the brush assembly.

4. A vacuum cleaner comprising:
   a main body configured to be movable relative to a brush assembly;
   a dust separating apparatus configured to be attached to the main body;
   a first fluid flow path configured to receive an external air stream from the brush assembly;
   a second fluid flow path configured to receive an external air stream from a hose;
   a third fluid flow path configured to discharge either of the external air stream received from the brush assembly and the external air stream received from the hose towards the dust separating apparatus; and
   a path selecting unit comprising:
      an inlet conduit selectively connectable to either of the first fluid flow path and the second fluid flow path;
      an outlet fixedly connected to the third fluid flow path; and
   a cam mechanism configured to move the inlet conduit in response to movement of the main body;
   wherein the path selecting unit further comprises a bendable tube connecting the inlet conduit to the outlet.

5. The vacuum cleaner of claim 4, wherein the cam mechanism is further configured to force the bendable tube to bend to connect the inlet conduit to the second fluid flow path in response to the main body being moved to a position substantially perpendicular to the brush assembly.

6. The vacuum cleaner of claim 5, wherein the cam mechanism is further configured to force the bendable tube to bend to connect the inlet conduit to the first fluid flow path in response to the main body being moved to a position not substantially perpendicular to the brush assembly.

7. The vacuum cleaner of claim 4, wherein the cam mechanism is further configured to change a curvature of the bendable tube as the path selecting unit selectively connects the inlet conduit to either of the first fluid flow path and the second fluid flow path.

* * * * *